(12) United States Patent
Carothers

(10) Patent No.: US 6,233,790 B1
(45) Date of Patent: May 22, 2001

(54) OUTER STRAP FOR AIR FILTER CARTRIDGE

(75) Inventor: Charles Grant Carothers, Glasgow, MO (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 09/343,748

(22) Filed: Jun. 30, 1999

(51) Int. Cl.$^7$ .................................................. B01D 27/06
(52) U.S. Cl. ..................... 24/16 PB; 24/17 AP; 24/17 A; 411/353
(58) Field of Search ............... 24/16 PB, 17 A, 24/17 AP, 16 R, 618, 622, 688, 689; 411/353, 504

(56) References Cited

U.S. PATENT DOCUMENTS

| | | | | |
|---|---|---|---|---|
| 1,540,921 | * | 6/1925 | Bidal | 24/618 X |
| 2,933,793 | * | 4/1960 | Steinberg et al. | 24/622 X |
| 3,208,331 | * | 9/1965 | Scholl | 411/504 X |
| 3,376,004 | * | 4/1968 | Goldman | 14/16 R X |
| 3,501,814 | * | 3/1970 | Anderson et al. | 24/16 PB X |
| 3,601,863 | * | 8/1971 | Dorsey | 24/16 PB X |
| 3,630,116 | * | 12/1971 | Harper | 411/504 X |
| 3,742,557 | * | 7/1973 | Francois | 24/33 B |
| 3,765,694 | * | 10/1973 | Allsop | 24/16 PB X |
| 4,058,186 | * | 11/1977 | Mullis | 24/16 PB X |
| 4,226,036 | * | 10/1980 | Krug | 24/16 PB X |
| 4,273,276 | * | 6/1981 | Perkins | 24/208 R |
| 4,319,385 | * | 3/1982 | Marchou | 24/16 PB |
| 4,436,536 | | 3/1984 | Robinson | 55/341 R |
| 4,443,237 | | 4/1984 | Ulvestad | 55/379 |
| 4,528,739 | * | 7/1985 | Kemp | 411/504 X |
| 4,560,477 | | 12/1985 | Moldow | 210/457 |
| 4,632,680 | | 12/1986 | Klimzak | 55/302 |
| 4,633,548 | * | 1/1987 | Siskind et al. | 24/145 |
| 4,663,041 | | 5/1987 | Miyagi et al. | 210/493.2 |
| 4,732,678 | | 3/1988 | Humbert, Jr. | 210/440 |
| 4,744,107 | * | 5/1988 | Fohl | 24/621 |
| 4,878,930 | | 11/1989 | Manniso et al. | 55/493 |
| 4,929,354 | | 5/1990 | Meyering et al. | 210/321.61 |
| 4,954,255 | | 9/1990 | Muller et al. | 210/437 |
| 5,068,811 | | 11/1991 | Johnston et al. | 364/551.01 |
| 5,074,896 | | 12/1991 | Baert et al. | 55/341.6 |
| 5,094,579 | * | 3/1992 | Johnson | 411/353 X |
| 5,207,812 | | 5/1993 | Tronto et al. | 55/498 |
| 5,211,846 | | 5/1993 | Kott et al. | 210/232 |
| 5,632,791 | | 5/1997 | Ourssoren et al. | 55/486 |
| 5,837,017 | | 11/1998 | Santschi et al. | 55/302 |
| 5,848,801 | * | 12/1998 | Hirt | 411/504 X |
| 6,073,315 | * | 6/2000 | Rasmussen | 24/16 PB |

* cited by examiner

Primary Examiner—Lynne H. Browne
Assistant Examiner—John R. Cottingham
(74) Attorney, Agent, or Firm—Shook, Hardy & Bacon

(57) ABSTRACT

A fastener for an outer strap of an air filter cartridge is provided. The outer straps have apertures formed on either end of the strap. An eyelet assembly is secured within one of the apertures. The eyelet assembly includes an eyelet and a backing washer. The eyelet has an annular top placed flush with one side of the strap and a sleeve received within the aperture. The peripheral edge of the sleeve is crimped outwardly to secure the backing washer to the side of the strap opposite the eyelet top. When the strap is secured about a circumference of the cartridge filter, the apertures are aligned and a rivet is placed within the apertures. The rivet has a head and a body. The rivet body pulls the crimped eyelet sleeve and washer toward the rivet head and the ends of the straps are held in firm connection with one another.

3 Claims, 3 Drawing Sheets

OUTER STRAP FOR AIR FILTER CARTRIDGE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to filters for industrial baghouses and more particularly to a fastener for securing the end of an outer strap placed around a baghouse cartridge filter.

Baghouses utilizing cartridge filters are commonly used to remove particulates in industrial situations. The baghouses include two large chambers, or plenums, that are divided by a tube sheet preferably formed from sheet metal. The tube sheet comprises a plurality of openings for receipt of air filter cartridges, preferably containing fabric filtration elements. Fabric filter media having longitudinal pleatings are particularly effective for removing particulates. One such air filter cartridge is disclosed in U.S. Pat. No. 5,632,791 to Reinout G. Oussoren and Jack T. Clements, herein incorporated by reference in its entirety.

Air containing unwanted particulates is forced into the first plenum by a forced air means such as a fan. The air passes from the first plenum to the second plenum via the air filter cartridges held by the tube sheet. The particulates are retained on the outer surface of the fabric filter element of the cartridge filter, and the cleaned air is directed into the second plenum and exits the baghouse through an exhaust passageway.

Oftentimes, the baghouses are operated continuously for relatively long periods of time. As with most physical filtration media, the effectiveness of the fabric filters diminishes as particulates collect on the outer surfaces of the filter elements and minimize the airflow through the filters. To remove undesirable accumulations of particulates on the baghouse filters, air may be pulsed through the baghouse cartridge filters from the second plenum to the first plenum. The pulses dislodge the particulates lodged on the exterior of the filter, and the loose particulates are removed from the first plenum. Accordingly, the effectiveness of the baghouse is greatly increased without having to repeatedly remove and replace the cartridges. One such apparatus for cleaning baghouse filters is disclosed in U.S. Pat. No. 5,837,017 to March Santschi and Gregg Zolttek, herein incorporated by reference in its entirety.

However, the cleaning process is not without drawbacks. For instance, the structural integrity of the cartridge filters begins to deteriorate due to the relatively strong forces applied to the cartridge walls. Specifically, the cartridge walls tend to deflect outwardly when the pulses of air are forced from the interior to the exterior of the cartridge walls during the cleaning process. Thus, belt-like straps tightly secured about the circumference of the cartridges have been used to minimize the bending and bowing of the pleated filters. Typically, the ends of the straps are fastened by opposing snap means on either end of the straps. However, the snap means do not provide the desired strength needed in baghouse applications. Moreover, the snap heads tend to have relatively high profiles extending beyond the curved face of the strap. The snaps often sheer when the cartridges are slid into the openings in the baghouse tube sheets. Further, attempts to spot weld the opposing ends of the straps to one another do not provide the desired strength. Also, attempts to place a rivet through corresponding holes on either end of the strap have failed due to the difficulty associated with placing a washer behind the strap while applying the rivet.

Accordingly, the need exists for a method and apparatus to secure the ends of a strap positioned about a baghouse cartridge filter that does not sheer when the cartridges are placed in the tube sheet while providing enough strength to prevent failure due to the high forces during the cleaning process.

It is an object of the present invention to overcome the problems associated with the prior art.

BRIEF SUMMARY OF THE INVENTION

A fastener for an outer strap of an air filter cartridge is provided. The outer straps have apertures formed on either end of the strap. An eyelet assembly is secured within one of the apertures. The eyelet assembly includes an eyelet and a backing washer. The eyelet has an annular top placed flush with one side of the strap and a sleeve received within the aperture. The peripheral edge of the sleeve is crimped outwardly to secure the backing washer to the side of the strap opposite the eyelet top. When the strap is secured about a circumference of the cartridge filter, the apertures are aligned and a rivet is placed within the apertures. The rivet has a head and a body. The rivet body pulls the crimped eyelet sleeve and washer toward the rivet head and the ends of the straps are held in firm connection with one another.

BRIEF DESCRIPTION OF THE SEVERAL VIEWS OF THE DRAWING

The objects and features of the invention noted above are explained in more detail with reference to the drawings, in which like reference numerals denote like elements, and in which.

DETAILED DESCRIPTION OF THE INVENTION

Figure 1:
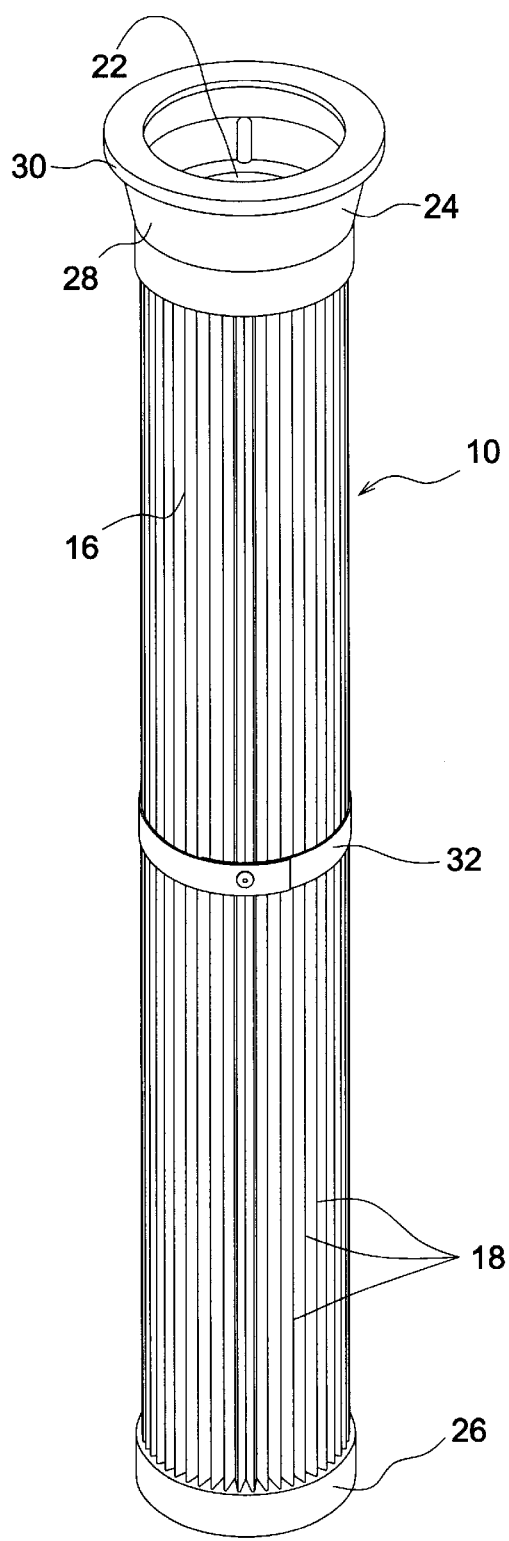
FIG. 1 illustrates a perspective view of a filter cartridge having a strap according to the present invention.
Figure 2:
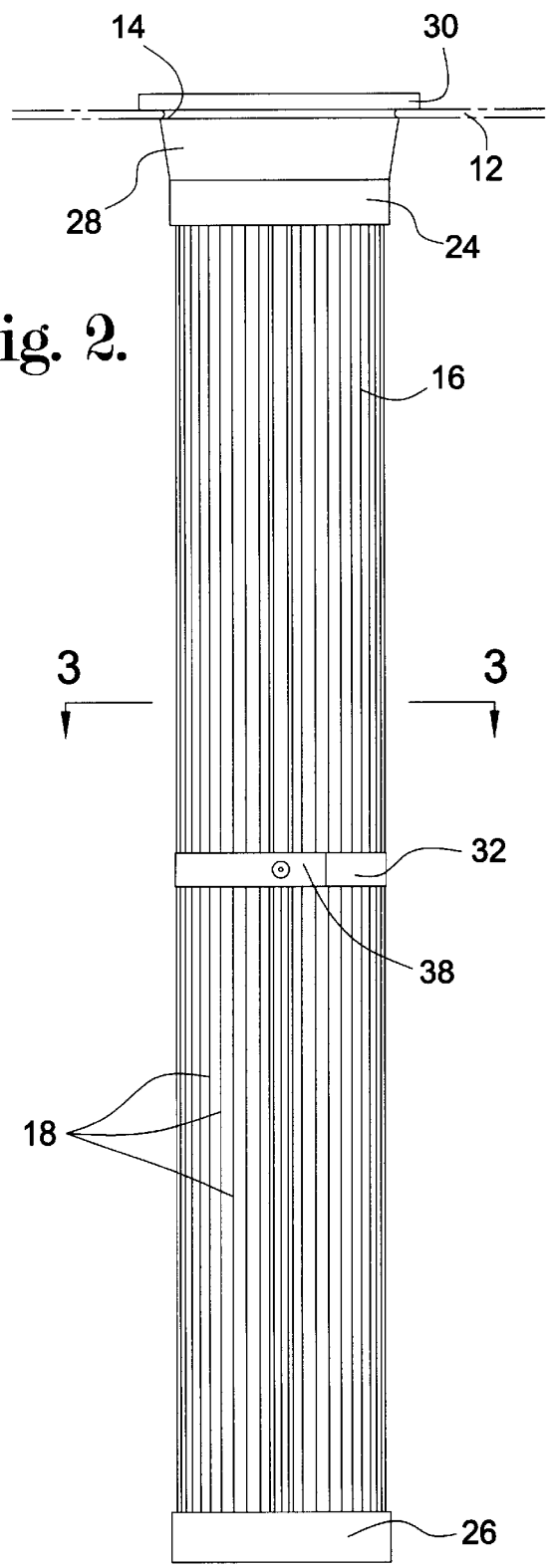
FIG. 2 illustrates a side elevational view of a filter cartridge having a strap according to the present invention.
Figure 3:
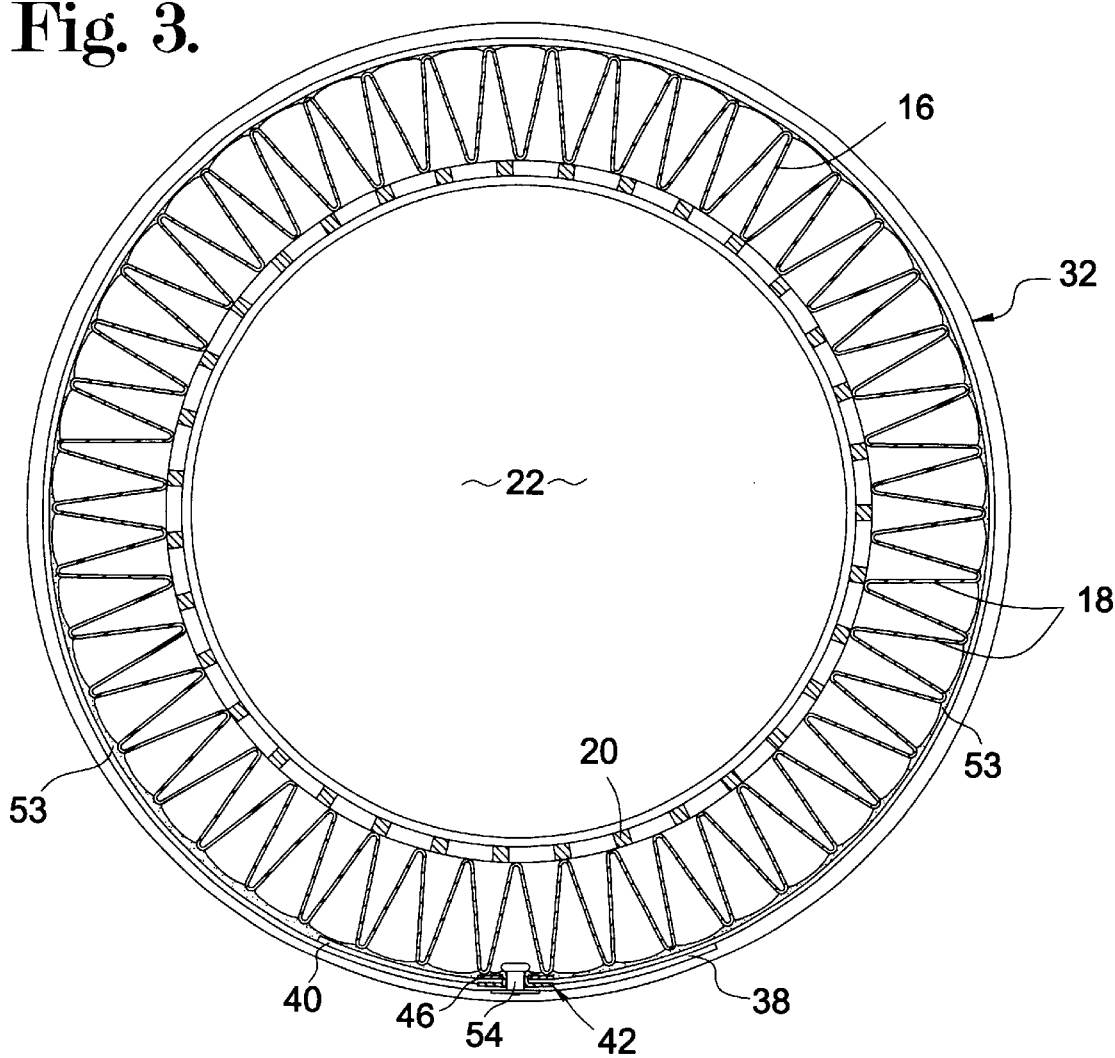
FIG. 3 illustrates a horizontal sectional view of the filter cartridge taken along line 3—3 of FIG. 2.

FIG. 1 generally illustrates a filter cartridge according to the present invention and designated by the reference numeral 10. As shown in FIG. 2, the filter cartridge 10 is received within a tube sheet 12 having a circular opening 14. The filter cartridge 10 includes a fabric filter 16, also known as a pleat pack. The fabric filter 16 is generally tubular and includes a number of pleats 18, or accordion folds, about the perimeter of the filter. With reference to FIG. 3, the pleats 18 of fabric filter 16 abut an inner screen 20 defining an elongate central passageway 22 formed within the filter cartridge. The fabric frame 16 and screen 20 are held to one another at an upper cap 24 and an opposing lower cap 26. Upper cap 24 includes a tapered section 28 and a ledge 30. When the cartridge 10 is placed through the opening 14 in the tube sheet, the ledge 30 suspends the cartridge in a vertical orientation. With reference now to U.S. Pat. No. 5,632,791 to Oussoren and Clements, incorporated above, a cartridge filter is described in greater detail.

A narrow strap 32 is secured around the circumference of the fabric filter 16 at a central position between upper cap 24 and lower cap 26. The strap is secured at a first end 38 and a second end 40 as described in further detail below. The strap is made from a material having a high tensile strength such as woven polyester, nomex, or other suitable materials.

Figure 5:
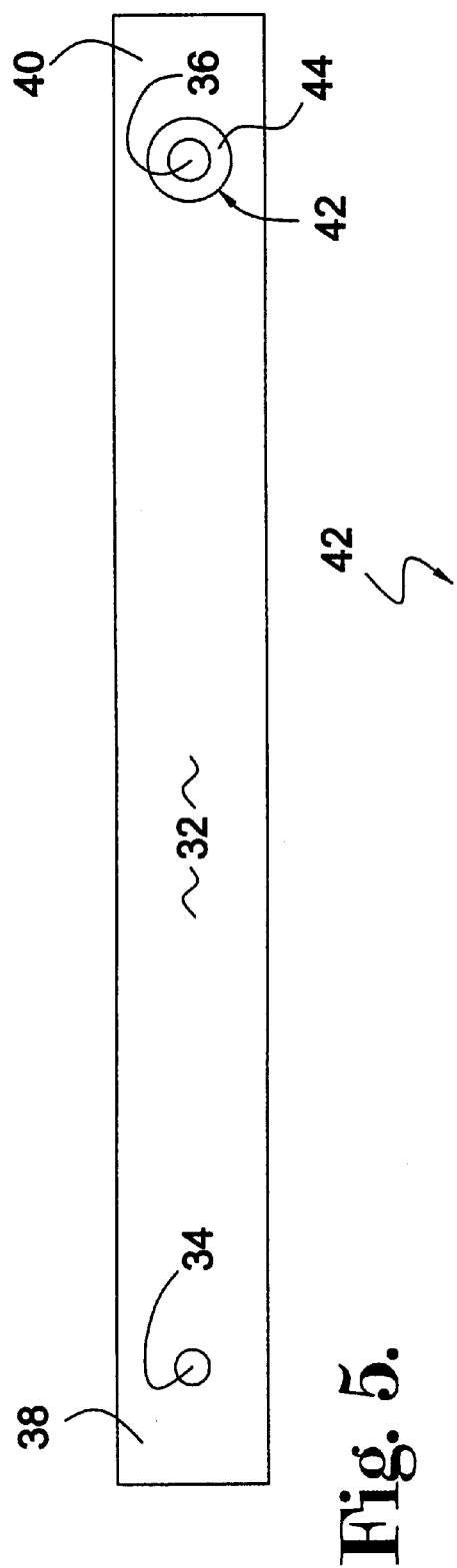
FIG. 5 is a plan view of the strap of the present invention before the strap is assembled to the filter cartridge.
Figure 6:
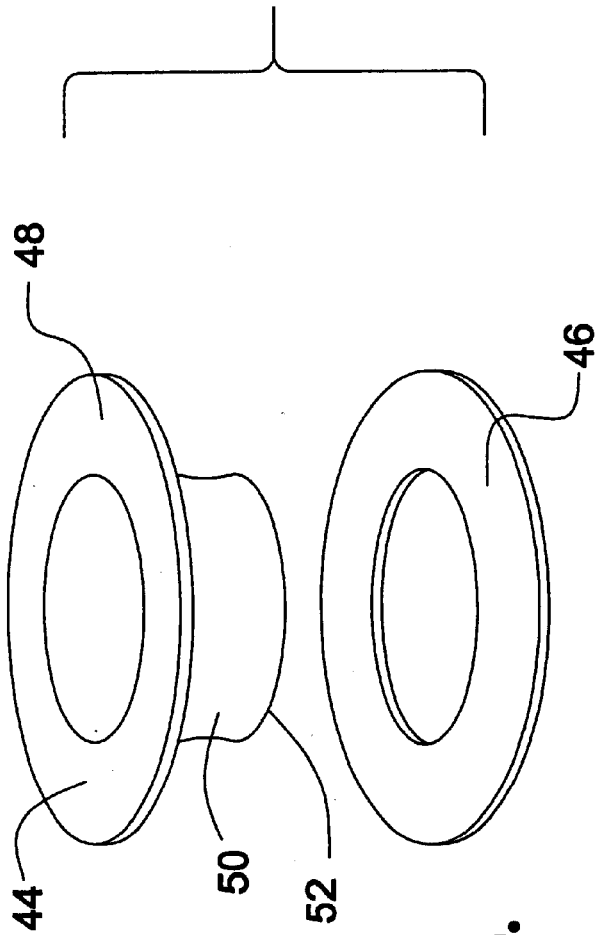
FIG. 6 is an exploded perspective view of the eyelet assembly of the present invention.

With reference to FIG. 5, before the strap is placed around the fabric filter 16, apertures 34 and 36 are formed centrally at the first end 38 and second end 40 of the strap. Preferably, the apertures are sonic welded into the strap so that the edges of the apertures resist fraying. An eyelet assembly 42 is positioned within aperture 36. With reference to FIG. 6, the eyelet assembly includes an eyelet 44 and a backing washer 46. The eyelet 44 has a flat, annular top 48 and a sleeve 50 extending generally transversely from the inner diameter the of eyelet top. The sidewalls of sleeve 50 are preferably arcuate and concave inwardly, and have a cross sectional width that is slightly smaller than the diameter of aperture 36 at the midpoint of the sleeve 50. The annular backing washer 46 has an outer diameter generally equal in size to the outer diameter of eyelet top 48. The inner diameter is of the appropriate size to allow receipt of the eyelet sleeve 50.

Figure 4:
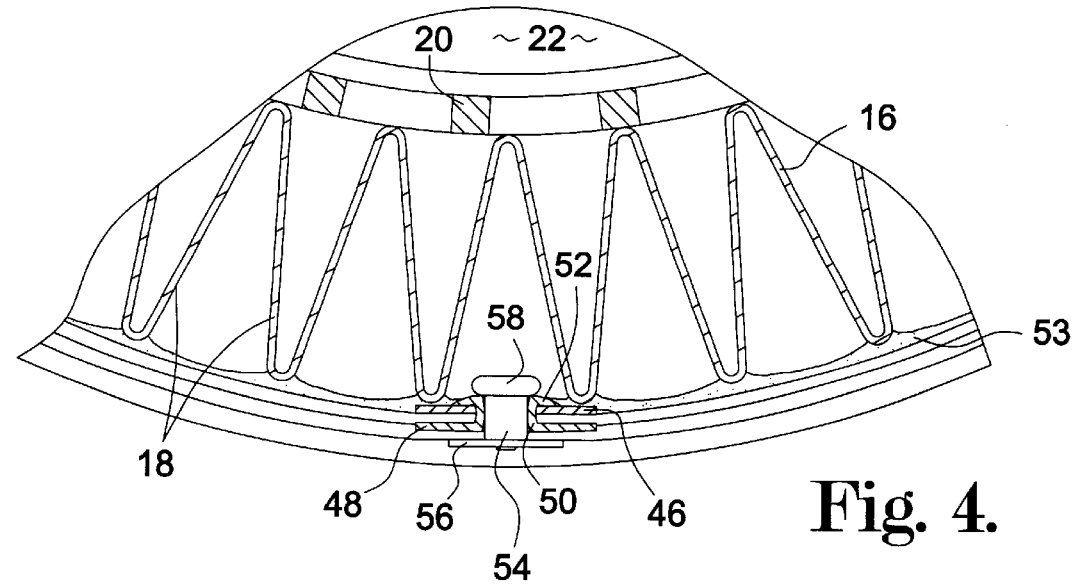
FIG. 4 is an enlarged fragmentary plan view of a filter cartridge illustrating the strap fastener of the present invention.

To assemble the strap 32, the backing washer 46 is placed in alignment with aperture 36 on the back of the strap 32. The eyelet sleeve 50 is placed through aperture 36 and the inner diameter of backing washer 46. Then, as best shown in FIG. 4, the peripheral edge 52 of eyelet sleeve 50 is crimped outwardly to secure the backing washer 46 between the edge 52 and the back of strap 32, and to hold the eyelet top 48 in firm connection with the top of strap 32. The crimped portion of sleeve 50 and backing washer 46 are generally flush with the surface of strap 32. Likewise, once secured, eyelet top 48 lies generally flush with the opposing side of strap 32.

The strap 32 is then placed around the cartridge 10 and adhered to the pleats 18 at an adhesive layer 53. The second end 40 is first adhered to the cartridge 10 with the backing washer 46 of the eyelet assembly 42 directed toward the pleats. The strap is wrapped around the circumference of the cartridge and the first end 38 overlaps second end 40 so that apertures 34 and 36 are aligned with one another.

Finally, a rivet 54 is placed through the first aperture 34 and the eyelet 44 within the second aperture 36. The rivet 54 has a head 56 with a relatively low profile and a body 58 that is bent outwardly into contact with the crimped portion of eyelet sleeve 50. As the rivet is secured, the rivet body 58 pulls the backing washer 46 toward the rivet head 56 to tightly and securely hold the opposing ends 38, 40 of strap 32 to one another between the washer 46 and rivet head 56.

Thus, the eyelet assembly 42 of the present invention allows the backing washer 46 to be positioned on the back of strap 32 prior to fastening the ends to one another and avoids the problem of holding the washer between the pleated filter 16 and the back of the strap 32 when the ends of the strap are secured to one another. Further, the rivet projects a relatively low profile on the outer side of the strap. Thus, the rivet does not shear when the cartridge filter 10 is slid within the openings 14 of the tube sheet 12 as with the snap fasteners of the prior art.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A strap placed around a filter cartridge, comprising:

a first end having a first aperture;

a second end having a second aperture, and an eyelet assembly having a sleeve and a washer, said sleeve extending through said first aperture and turned outwardly to secure said washer to said strap, and a rivet placed within said sleeve of said eyelet in said first aperture and said second aperture so that said ends are tightly secured to one another.

2. A method for fastening the ends of a strap having first and second apertures at each end of the strap around a cartridge filter, using an eyelet and a washer, said method comprising:

placing said eyelet within said first aperture;

crimping said eyelet around the washer;

wrapping said strap around said cartridge filter;

aligning said apertures, and riveting said ends of the strap to one another at said apertures.

3. A strap as recited in claim 1, wherein said washer is in generally planar relation with a surface defined by said outwardly turned sleeve.

* * * * *